Patented Mar. 11, 1924.

1,486,468

UNITED STATES PATENT OFFICE.

RUDOLF TAMBACH, OF LUDWIGSHAFEN-ON-THE-RHINE, GERMANY, ASSIGNOR, BY MESNE ASSIGNMENTS, TO THE CHEMICAL FOUNDATION, INC., A CORPORATION OF DELAWARE.

PROCESS FOR RENDERING DURABLE EXTRACTS OF DRUGS.

No Drawing.   Application filed January 25, 1917. Serial No. 144,516.

*To all whom it may concern:*

Be it known that I, Dr. RUDOLF TAMBACH, chemist, a subject of the German Emperor, residing at Ludwigshafen-on-the-Rhine, German Empire, have invented new and useful Improvements in Processes for Rendering Durable Extracts of Drugs; and I do hereby declare the following to be a full, clear, and exact description of the same.

In drugs of medicinal importance the effective constituents are generally combined with other constituents upon which depend more or less the stability of the galenic preparations.

In the case of digitalis leaves the glycosides acting on the heart are combined with tannic acid compounds (see Gottlieb and Tambach, Munch. med. Wochenschrift 1911, page 11, column 1, paragraph 6). These compounds, which have been isolated from the leaves by Gottlieb and Tambach, and are called digitannoids, are very easily dissolved in dilute alkalies. The solutions are particularly suitable for administration by means of injection, but become musty when allowed to remain in contact with the air. They must therefore be preserved in ampullæ, and be sterilized. The price of the preparations, consequently, is considerably increased.

It is well known that by adding glycerin to such solutions small organisms are prevented from developing, and it is also known that camphor prevents putrefication and exercises a preserving action (see Eulenburg, Real-Enzyklopadie der ges. Heilkunde 1909, volume 7, page 522, paragraph 5). Further, the addition of camphor for the purpose of preserving tannin and gallic acid is known (see Chem. Zentralblatt 1900, I, page 1107, 2. paragraph from the bottom).

Full or refined extracts of digitalis leaves, by the addition of glycerin or of such small quantities of camphor, as, according to its solubility, can be dissolved in aqueous alkaline solutions, are not protected against inoculation by must organisms or the like in such a manner that they can be used without danger for injections.

Now it has been found that it is possible to preserve solutions of drugs, particularly solutions of digitalis leaves, or of digitalis extracts, if glycerin and camphor, or camphor surrogates, are added thereto or of such composition that the extracted substances will not be thrown out of the solution, solutions of these substances. By camphor surrogates such agents are to be understood which, like synthetic camphor, are able to exercise the functions of camphor in preserving solutions of drugs, and when camphor is mentioned in the claims all such surrogates are likewise included. In solutions to which glycerin and camphor have been added the development of bacteria and other organisms is prevented, so that such solutions may remain in contact with the air without becoming unsuitable for injections. The glycerin is not used for the purpose of obtaining more concentrated solutions, as in the case of a large number of organic substances. In the presence of glycerin aqueous solutions of camphor are not more concentrated than without glycerin.

*Example I.*

An infusion of 1 kg. of digitalis leaves 1 to 10 is heated for 1 hour with 4 kg. of glycerin and with 20 g. camphor. When the solution is cold it is separated from the undissolved matter.

*Example II.*

100 gr. of the refined dry extract obtained according to the process set forth in the German Patent 227572 or 245193 are dissolved with 400 ccm. of 2% soda solution and 1 liter boiled water, then 500 gr. of glycerin and 50 gr. of camphor are added, and the whole is diluted with boiled water until a total volume of 14 liters is obtained. When cold the solution is filtered.

*Example III.*

100 gr. of the digitannoid compound obtained according to the process set forth in the German Patent 246571 are dissolved in 1 liter of boiled water, the whole is diluted with boiled water until a total volume of 14 liters is obtained and heated with 500 gr. glycerin and 50 gr. camphor at a temperature of about 70° C. When cold the solution is filtered.

Other drug solutions, which readily become musty, such as opium, secale cornutum etc., may be treated in a similar manner.

By adding glycerin and camphor to these solutions they are prevented from becoming musty.

What I claim and desire to secure by Letters Patent of the United States is:—

1. The process for preparing stable drug extracts which comprises adding glycerine and camphor to such extract and then heating.

2. The process for preparing stable drug extracts which comprises adding glycerine and camphor to such extract, heating and then separating the insoluble from the soluble portions.

3. The process for preparing a stable digitalis extract which comprises adding glycerine and camphor to a refined digitalis extract, heating and then separating the insoluble from the soluble portions.

4. The process for preparing a digitalis extract which comprises preparing an infusion of digitalis, adding thereto glycerine and camphor, heating and filtering.

5. The process for preparing a digitalis extract which comprises preparing an infusion of digitalis leaves in the proportion 1 to 10 adding thereto glycerine and camphor, heating and filtering.

6. The process for preparing a digitalis extract which comprises preparing an infusion from 1 kilogram of digitalis leaves in the proportion 1 to 10, adding thereto about 4 kilograms of glycerine and 20 grams of camphor, heating and filtering.

7. A new composition which consists of an extract of digitalis to which has been added from about 35 to 40 per cent—based on the amount of digitalis extract—of glycerine and about one per cent—based on the amount of glycerine added—of camphor.

8. A new composition of matter consisting of an extract of digitalis 1 part, together with glycerine .4 part and camphor .002 part.

In testimony whereof I have signed my name to this specification.

Dr. RUDOLF TAMBACH.